(12) United States Patent
Rose et al.

(10) Patent No.: US 10,530,101 B2
(45) Date of Patent: Jan. 7, 2020

(54) PLUG CONNECTOR PART HAVING A TEMPERATURE-MONITORING DEVICE

(71) Applicant: Phoenix Contact E-Mobility GmbH, Schieder-Schwalenberg (DE)

(72) Inventors: Markus Rose, Paderborn (DE); Thomas Fuehrer, Blomberg (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 115 days.

(21) Appl. No.: 15/567,084

(22) PCT Filed: Apr. 20, 2016

(86) PCT No.: PCT/EP2016/058682
§ 371 (c)(1),
(2) Date: Oct. 17, 2017

(87) PCT Pub. No.: WO2016/169940
PCT Pub. Date: Oct. 27, 2016

(65) Prior Publication Data
US 2018/0097316 A1    Apr. 5, 2018

(30) Foreign Application Priority Data
Apr. 23, 2015    (DE) .................. 10 2015 106 251

(51) Int. Cl.
*H01R 13/66*    (2006.01)
*G01D 11/30*    (2006.01)
(Continued)

(52) U.S. Cl.
CPC ............ *H01R 13/6683* (2013.01); *B60L 3/04* (2013.01); *H01R 13/7137* (2013.01); *H01R 13/20* (2013.01)

(58) Field of Classification Search
CPC .......... B60L 11/1818; B60L 3/00; B60L 3/04; B60L 11/18; H01R 12/58; H01R 13/20;
(Continued)

(56) References Cited

U.S. PATENT DOCUMENTS 5,181,859 A    1/1993    Foreman et al.
5,463,375 A  * 10/1995    Bauer .................. G08B 26/00
                                                    340/517
(Continued)

FOREIGN PATENT DOCUMENTS

DE    102013016550 A1    4/2015
DE    102014111334 A1    2/2016
(Continued)

*Primary Examiner* — Vuthe Siek
(74) *Attorney, Agent, or Firm* — Leydig, Voit & Mayer, Ltd.

(57) ABSTRACT

A plug-in connector part for connection to a mating plug-in connector part includes: a housing part; at least one electrical contact element, which is arranged on the housing part, for establishing electrical contact with the mating plug-in connector part; and a temperature-monitoring device including at least one sensor device for detecting a rise in temperature of the at least one contact element. The temperature-monitoring device includes a support element that extends over an entire surface thereof along a plane and includes at least one opening and one contact surface arranged at the at least one opening, the at least one contact element extending through the at least one opening such that the at least one contact element abuts the contact surface, and the at least one sensor device being arranged on the support element so as to detect a rise in temperature of the at least one contact element.

11 Claims, 6 Drawing Sheets

(51) Int. Cl.
*G01D 11/24* (2006.01)
*B60L 3/04* (2006.01)
*H01R 13/713* (2006.01)
*H01R 13/20* (2006.01)

(58) Field of Classification Search
CPC ........... H01R 13/6683; H01R 13/7137; H01R 13/66; Y02T 10/7005; Y02T 10/7072; Y02T 90/14
See application file for complete search history.

(56) References Cited

U.S. PATENT DOCUMENTS

| | | |
|---|---|---|
| 6,210,036 B1 | 4/2001 | Eberle et al. |
| 8,325,454 B2 | 12/2012 | Brugner et al. |
| 2006/0094289 A1 | 5/2006 | Kim et al. |
| 2016/0039297 A1 | 2/2016 | Kretschmer et al. |
| 2016/0104978 A1* | 4/2016 | Chaumeny ......... H01R 13/6683 439/620.22 |

FOREIGN PATENT DOCUMENTS

| | | |
|---|---|---|
| EP | 2605339 A1 | 6/2013 |
| GB | 2489988 A | 10/2012 |
| WO | WO 2014188130 A1 | 11/2014 |

\* cited by examiner

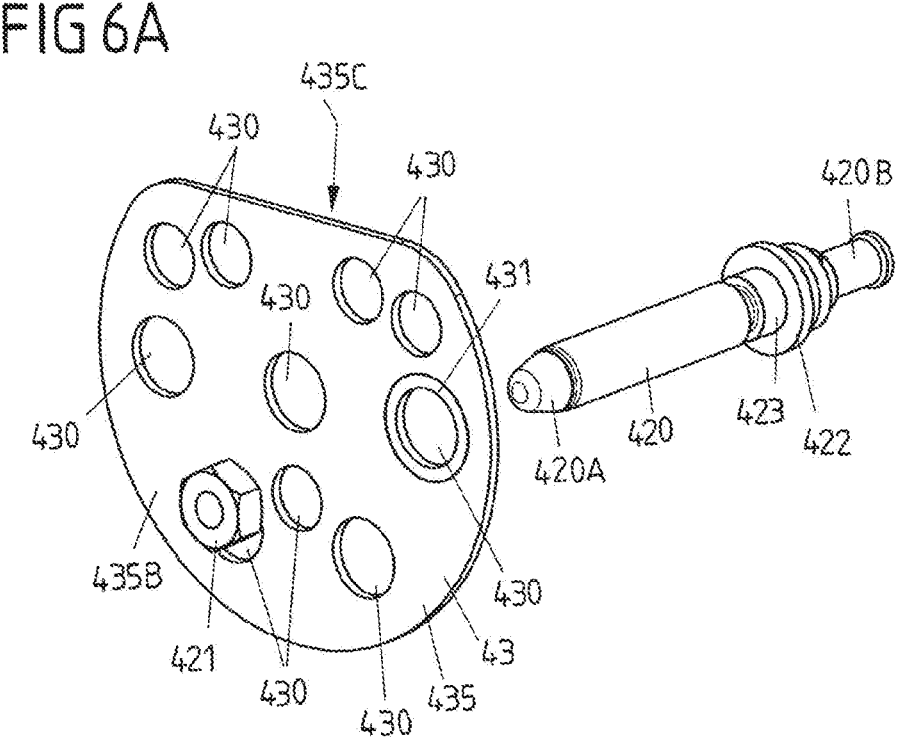
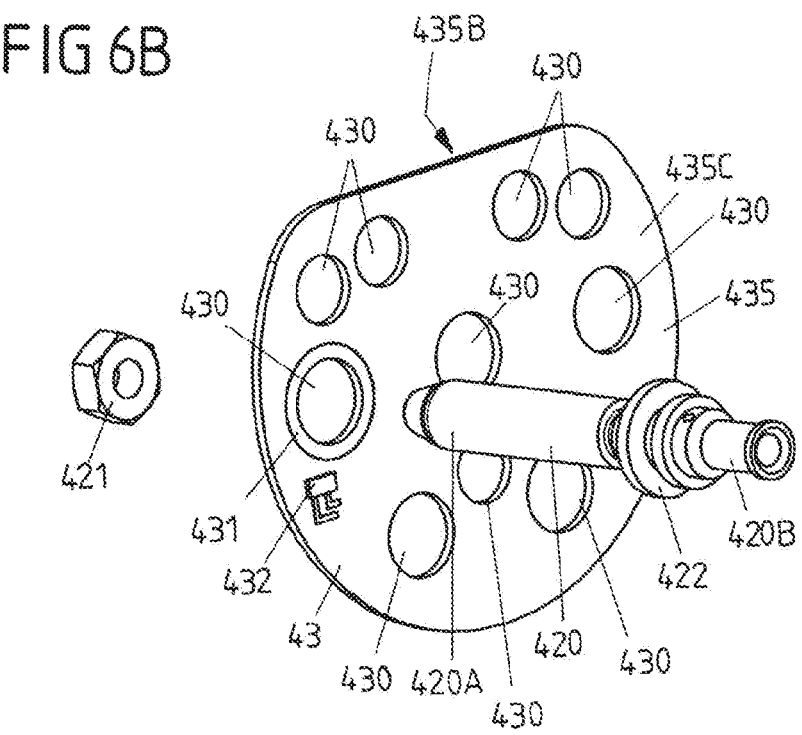

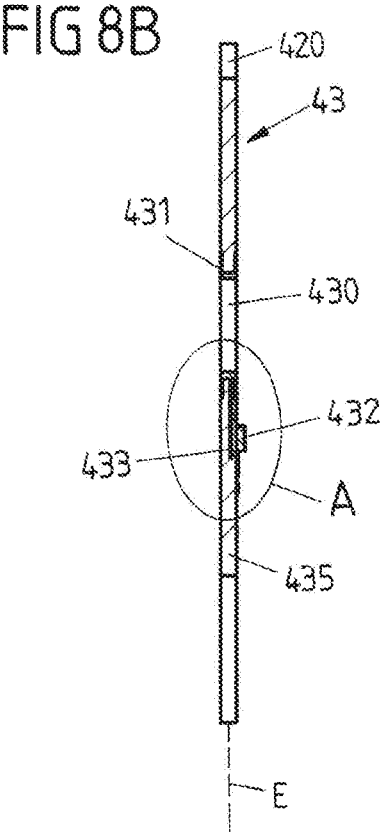
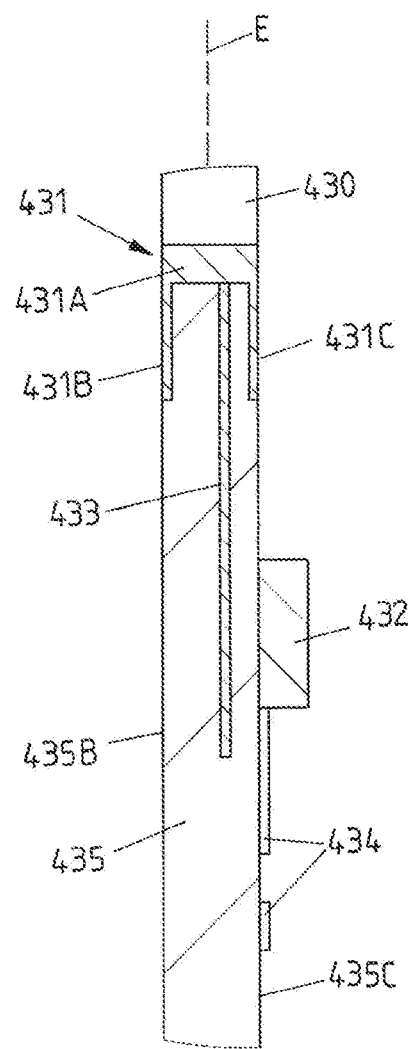

PLUG CONNECTOR PART HAVING A TEMPERATURE-MONITORING DEVICE

CROSS-REFERENCE TO PRIOR APPLICATIONS

This application is a U.S. National Phase application under 35 U.S.C. § 371 of International Application No. PCT/EP2016/058682, filed on Apr. 20, 2016, and claims benefit to German Patent Application No. DE 10 2015 106 251.8, filed on Apr. 23, 2015. The International Application was published in German on Oct. 27, 2016 as WO 2016/169940 under PCT Article 21(2).

FIELD

The invention relates to a plug-in connector part, intended for connection to a mating plug-in connector part.

BACKGROUND

A plug-in connector part of this type comprises a housing part, at least one electrical contact element, which is arranged on the housing part, for establishing electrical contact with the mating plug-in connector part, and a temperature-monitoring device comprising at least one sensor device for detecting a rise in temperature of the at least one contact element.

A plug-in connector part of this type can be a plug or a socket. Such a plug-in connector part can, in particular, be used in a charging device for transmitting a charging current. The plug-in connector part can in particular be formed as a charging plug or charging socket for charging a motor vehicle driven by an electric motor (also referred to as an electric vehicle).

Charging plugs or charging sockets for charging electric vehicles can be designed such that large charging currents can be transmitted. Since the thermal power dissipation increases quadratically with the charging current, such charging plugs or charging sockets require temperature monitoring in order to identify whether components of the charging plug or the charging socket are overheating in good time and so that the charging current can be modified or the charging device can even be switched off if necessary.

In a charging plug known from EP 2 605 339 A1, a temperature sensor is arranged on an insulator, approximately centrally between contact elements of the contact plug. The temperature sensor can identify whether the temperature anywhere on the contact elements has risen excessively, in order to switch off the charging process if necessary.

In a charging plug known from GB 2 489 988 A, a plurality of temperature sensors are provided, which transmit temperature data via a line. Control of a charging process depends on the temperature range within which the temperatures are recorded at the temperature sensors.

U.S. Pat. No. 6,210,036 B1 discloses a plug-in connector, in which a plurality of temperature sensors are interlinked in series by means of a single-wire line. The temperature sensors are arranged on an insulator and undergo a significant change in resistance, at a predetermined temperature, which is of such a size that a control circuit connected to the line can record the change and can either adapt or, if necessary, switch off the flow of current through the charging plug.

U.S. Pat. No. 8,325,454 B2 discloses a plug, in which thermistors that are interconnected in parallel are assigned to individual contacts and, if a threshold temperature is exceeded, switch a thyristor to "conduction mode" in order to thereby switch off a flow of current through the contacts.

In charging plugs known in the art, temperature sensors are embedded in an insulator in particular. This is needed to electrically insulate the temperature sensors from the contact elements, the temperature of which may increase. However, this simultaneously has the drawback that a change in temperature of one of the contact elements is transmitted via the insulator with a time delay and is therefore perceived at the temperature sensors with a time delay. In particular in concepts which are intended to allow for rapid switching off of a load circuit in the event of a fault, such temperature sensor arrangements are therefore not always suitable.

There is a need for a temperature-monitoring device, which can have a simple and inexpensive structure and makes it possible for the temperature of the contact elements to be monitored with rapid response behavior such that countermeasures, for example rapidly switching off a charging current, can be swiftly taken. It is also desirable here for signals from such a temperature-monitoring device to be simple to evaluate so as to identify if one or more contact elements of the plug-in connector part are overheating in a cost-effective yet reliable manner.

SUMMARY

In an embodiment, the present invention provides a plug-in connector part for connection to a mating plug-in connector part, comprising: a housing part; at least one electrical contact element, which is arranged on the housing part, configured to establish electrical contact with the mating plug-in connector part; and a temperature-monitoring device comprising at least one sensor device configured to detect a rise in temperature of the at least one contact element, wherein the temperature-monitoring device comprises a support element that extends over an entire surface thereof along a plane and comprises at least one opening and one contact surface arranged at the at least one opening, the at least one contact element extending through the at least one opening such that the at least one contact element abuts the contact surface, and the at least one sensor device being arranged on the support element so as to detect a rise in temperature of the at least one contact element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 6A, 6B are exploded perspective views of the arrangement according to FIG. 5;

FIG. 8B is a sectional view along the line A-A according to FIG. 8B; and

FIG. 8C is an enlarged view of cut-out A according to FIG. 8B.

DETAILED DESCRIPTION

Figure 1:
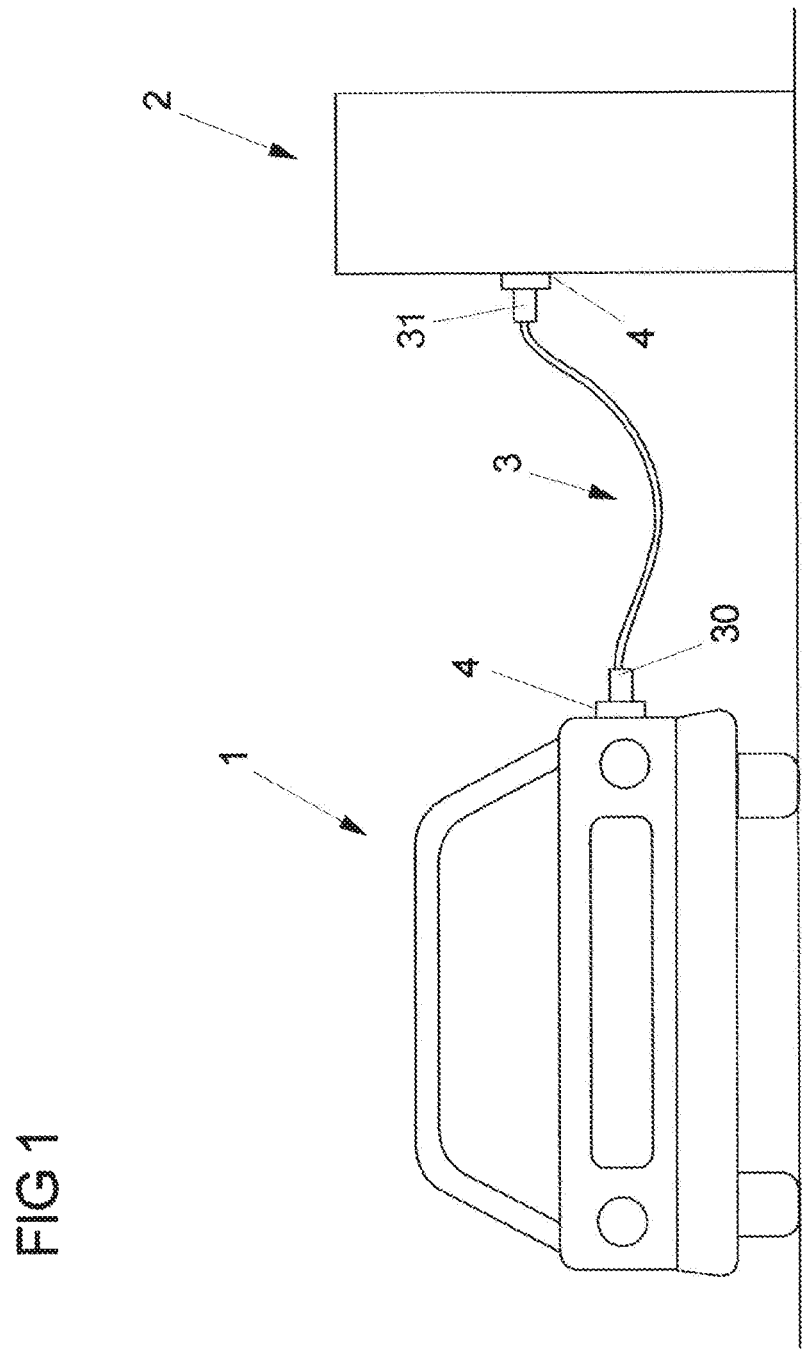
FIG. 1 is a schematic view of an electric vehicle comprising a charging cable and a charging station for charging.

The temperature-monitoring device accordingly comprises a support element that extends over the entire surface thereof along a plane and comprises at least one opening and one contact surface arranged at the at least one opening, the at least one contact element extending through the at least one opening such that the at least one contact element abuts the contact surface, and the at least one sensor device being arranged on the support element in order to detect a rise in temperature of the at least one contact element.

The support element can be formed as a printed circuit board, for example, which supports electrical conducting tracks on a supporting body made of an electrically insulating material.

Since the at least one contact element extends through an opening in the support element and touches the contact surface of the opening, the at least one contact element makes contact with the contact surface, in particular the metal contact surface. The support element is therefore thermally coupled to the at least one contact element by means of the contact surface such that the at least one sensor device arranged on the support element can detect a rise in temperature of a contact element via the contact surface.

Since a sensor device can therefore be arranged in close spatial proximity to an associated contact element, the sensor device can detect a rise in temperature of the contact element without a great amount of temporal latency, i.e. with swift response behavior, and therefore the information regarding the rise in temperature can be swiftly evaluated in order to take a suitable countermeasure, for example switching off a loading current being transmitted.

In the event that a plurality of electrical contact elements are provided, it is advantageous for a plurality of openings to also be made in the support element, one opening being assigned to each contact element and each contact element therefore extending through an opening in the support element. In this case, a contact surface, for example a metal contact surface, is arranged at each opening such that each contact element is thermally coupled to the contact surface. In this way, a rise in temperature of each contact element can be detected by means of one or more sensor devices via the contact surface.

However, it is also conceivable and possible in this context for only the temperature of the contact elements that carry large currents during operation, for example large charging currents, to be monitored. Accordingly, it is possible for a (metal) contact surface to only be provided at the openings in the support element through which a contact element extends, which element is to be monitored and is subjected to thermal loading during operation, for example.

The contact element or plurality of contact elements advantageously extend(s) perpendicularly through the support element. The support element extends over the entire surface of said temperature-monitoring device in the plane assigned thereto, while the contact elements are perpendicular to this plane.

The contact elements can be formed by cylindrical metal pins, for example, which extend perpendicularly through openings provided in the support element. Accordingly, the openings in the support element can be circular-cylindrical and can be surrounded by metal contact surfaces.

The contact surfaces are advantageously formed as VIAs [vertical interconnect access] on the openings in the support element. A cover surface in the form of a preferably metal layer covers the inner edge of an opening, for example, and extends from a first side of the support element, through the opening, and to the opposite second side of the support element that covers the entire surface of said temperature-monitoring device. The support element itself is preferably made of an electrically insulating material here, for example a plastics material, in particular a conventional printed circuit board material, such as FR 4.

The cover surface covers the inner edge of the opening. A (metal) contacting ring, which runs around the opening and extends over the surface of the support element in the shape of a ring, can be attached to the cover surface, outside the opening, on one side or on both sides of the support element.

Such a metal contacting ring on one or on both sides of the support element can be used to advantageously thermally couple an associated contact element to the support element. A contact element assigned to an opening therefore advantageously sits in the assigned opening by means of a shank portion and is clamped to the support element, whereby a collar of the contact element that radially projects from the shank portion comes to lie on one side of the support element and a screw element in the form of a nut that is screwed onto the shank portion comes to lie on the other side of the support element, for example, such that the support element is clamped between the collar on one side and the screw element on the other side. In this case, the collar advantageously abuts a contacting ring on one side of the support element and the screw element advantageously abuts a contacting ring on the other side of the support element such that advantageous contact is established by means of the collar on one side and by means of the screw element on the other side in order to thermally couple the contact element to the support element at the associated opening.

Alternatively, it is also conceivable in this context for the contact surface not to comprise a cover surface but to (only) be formed by a contacting ring on one side or by two contacting rings, one on either side of the support element. In the event that there is not a cover surface, in order to mechanically decouple the contact element, an electrically insulating but thermally conductive material (e.g. thermally conductive silicon), for example, can be used inside the opening.

One or more sensor devices are arranged on the support element and are used to detect a rise in temperature of one or more contact elements. Since a contact element that extends through an opening in the support element abuts the contact surface and/or the contacting rings arranged on either side of the support element, when the contact element heats up, the cover surface and/or the contacting rings also heat up. This can be recorded by the sensor device arranged on the support element such that a suitable sensor signal can be sent to a control device of the plug-in connector part or of a superordinate assembly coupled to the plug-in connector part, for example, of a vehicle or charging station in order to be able to take a suitable countermeasure, for example switching off a loading current or the like.

In order to achieve beneficial response behavior of the sensor device, the sensor device needs to be arranged so as to be advantageously thermally coupled to the associated contact element. In principle, this can be achieved by the sensor device being arranged on the support element in close spatial proximity to the contact element.

If, for example due to installation space it is not possible or desirable to arrange a sensor device directly in the region of a contact element, the contact element can be thermally coupled to the sensor device by means of an additional coupling portion. In an advantageous embodiment, such a coupling portion, preferably a metal coupling portion, is thermally connected to the contact surface (e.g. by a mechanical connection or by suitable thermal VIAs) and extends either in or on the support element, proceeding from the contact surface.

For example, such a couple portion can be arranged on one side of the support element in the form of a metal conducting track and can be connected to the cover surface or to a contacting ring of the contact surface that is attached to the cover surface.

In another embodiment, the support element can however also be made up of several layers, for example as a multi-layer printed circuit board. In this case, the coupling portion can be embedded in the support element, for example, is connected to the cover surface, for example, inside the support element, or makes contact with or is thermally connected to one or both of the contacting rings by means of thermal VIAs, and extends from the opening into the support element in parallel with the plane of the support element.

During operation of the plug-in connector part, the metal coupling portion, which is connected to the contact surface that is also metal, together with the contact element that is in contact with the contact surface, heats up. The heat produced at the contact element is therefore also transferred to the coupling portion without a (large) time delay. If the sensor device is arranged in close spatial proximity to the coupling portion, the rise in temperature of the coupling portion, which corresponds to the rise in temperature of the contact element, can be recorded at the sensor device with beneficial response behavior in order to transmit suitable sensor signals to a superordinate control device.

The sensor device assigned to an opening is, for example, arranged on one side of the support element, which extends over the entire surface of said temperature-monitoring device along the plane, i.e. on the surface of the support element. In this case, the sensor device is advantageously electrically insulated from the coupling portion by an intermediate layer of the support element made of an electrically insulating material being provided between the coupling portion, which extends inside the support element, and the sensor device on the surface of the support element. This intermediate layer can be comparatively thin and have a thickness of, for example, less than 1 mm, for example of a few tenths of a millimeter. In principle, the thickness of this electrically insulating intermediate layer is to be selected such that, on the one hand, the sensor device can detect a rise in temperature of the coupling portion with beneficial response behavior, and, on the other hand, the intermediate layer is voltage-proof enough to ensure reliable electrical insulation between the coupling portion and the sensor device.

In principle, it is also conceivable and possible in this context for the coupling portion to be arranged on one side of the support element, while the sensor device is arranged on the opposite, other side of the support element. The interposition of the electrically insulating support material of the support element ensures that the sensor device is therefore electrically decoupled from the coupling portion, effective thermal coupling together with beneficial response behavior of the sensor device also being achievable provided that the support element is thin enough.

In comparison with the sensor device, the coupling portion preferably has a large surface area so that, when the contact element and consequently the coupling portion heat up, the support element in the region around the sensor device heats up and the sensor device is therefore effectively thermally coupled to the coupling portion.

In this case, when viewed in a direction perpendicular to the plane of the support element, the coupling portion is preferably arranged either in or on the support element beneath the at least one sensor device. The sensor device is therefore opposite the coupling portion, the sensor device being arranged on the surface of the support element whereas the coupling portion is arranged inside the support element or on the other side of the support element.

In principle it is conceivable for the temperature-monitoring device to comprise the same number of sensor devices and contact elements to be monitored. In this case, each sensor device is assigned to exactly one contact element such that a rise in temperature of each contact element can be monitored separately by one sensor device.

Alternatively, it is also possible for a plurality of contact elements to be monitored by a common sensor device. In this case, for example, a common sensor device is assigned to a group of contact elements, which sensor device therefore qualitatively monitors whether the temperature of one or of a plurality of the contact elements in the group of contact elements has increased (to an unreliably high extent).

Sensor devices of the type described here are generally formed as temperature sensors in the form of temperature-dependent resistors, for example. Such temperature sensors can be resistors having a positive temperature coefficient (PTC resistors), for example, the resistance value of which increases as the temperature increases (also known as positive temperature coefficient thermistors, which have effective electrical conductivity at low temperatures and reduced electrical conductivity at higher temperatures). Such temperature sensors can also have a non-linear temperature characteristic, for example, and can be made of a ceramic material (ceramic positive temperature coefficient thermistors), for example.

However, electrical resistors having a negative temperature coefficient (NTC resistors), for example, can also be used as temperature sensors, the resistance value of which decreases as the temperature increases.

Temperature sensors formed by semi-conductor elements can also be used either as an alternative or in addition.

FIG. 1 is a schematic view of a vehicle 1 in the form of a vehicle driven by an electric motor (also referred to as an electric vehicle). The electric vehicle 1 comprises electrically chargeable batteries, which can be used to supply electrical power to an electric motor in order to move the vehicle 1.

In order to charge the batteries of the vehicle 1, the vehicle 1 can be connected to a charging station 2 by means of a charging cable 3. For this purpose, one end of the charging cable 3 can be plugged into an associated mating plug-in connector part 4 in the form of a charging socket of the vehicle 1 by means of a charging plug 30, and the other end is electrically connected to a plug-in connector part 4 in the form of a charging socket on the charging station 2 by means of a different charging plug 31. Charging currents having comparatively large current strengths are transmitted to the vehicle 1 by means of the charging cable 3.

FIGS. 2 to 8A-8C show an embodiment of a plug-in connector part 4, as it can be used in the charging cable 3 according to FIG. 1, for example.

Figure 2:
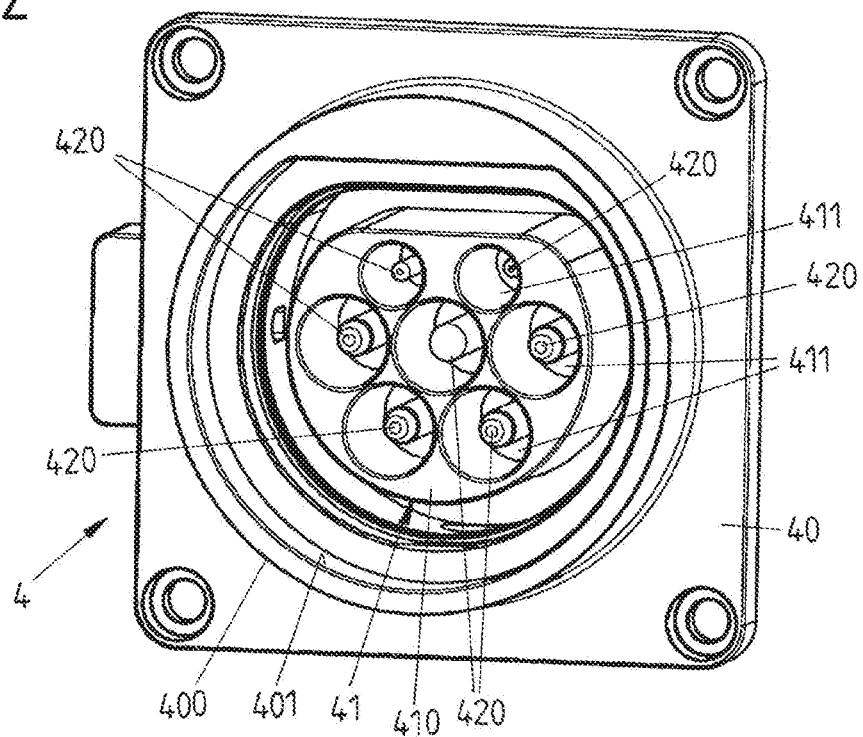
FIG. 2 is a perspective view of one embodiment of a plug-in connector part.

In the plug-in connector part 4 shown in overview in FIG. 2, a plug insert 41 is arranged on a housing part 40. The housing part 40 comprises an axially projecting collar 400 having an opening 401, in which the plug insert 41 is arranged such that a plug-in portion 410 is accessible from the outside and can be brought into plugged engagement with an associated mating plug-in connector part, for example a charging plug.

The plug-in portion 410 comprises a plurality of axially extending openings 411 which define a plug-in direction and in each of which a contact element 420 is arranged. By plugging said plug-in portion into the associated mating plug-in connector part, the contact elements 420 in the openings 411 in the plug-in portion 410 make electrical contact with associated mating contact elements of the mating plug-in connector part such that electrical contact is established between the plug-in connector part 4 and the mating plug-in connector part, and charging currents for a charging process can be transmitted, for example.

Figure 3:
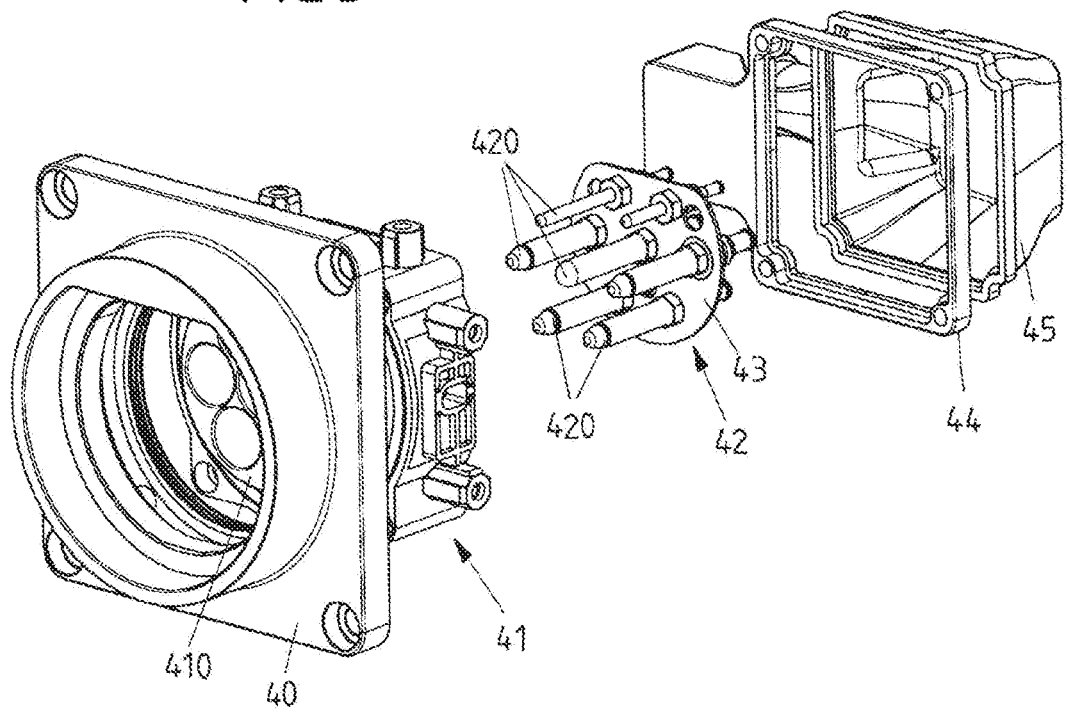
FIG. 3 is an exploded view of the plug-in connector part.
Figure 4:
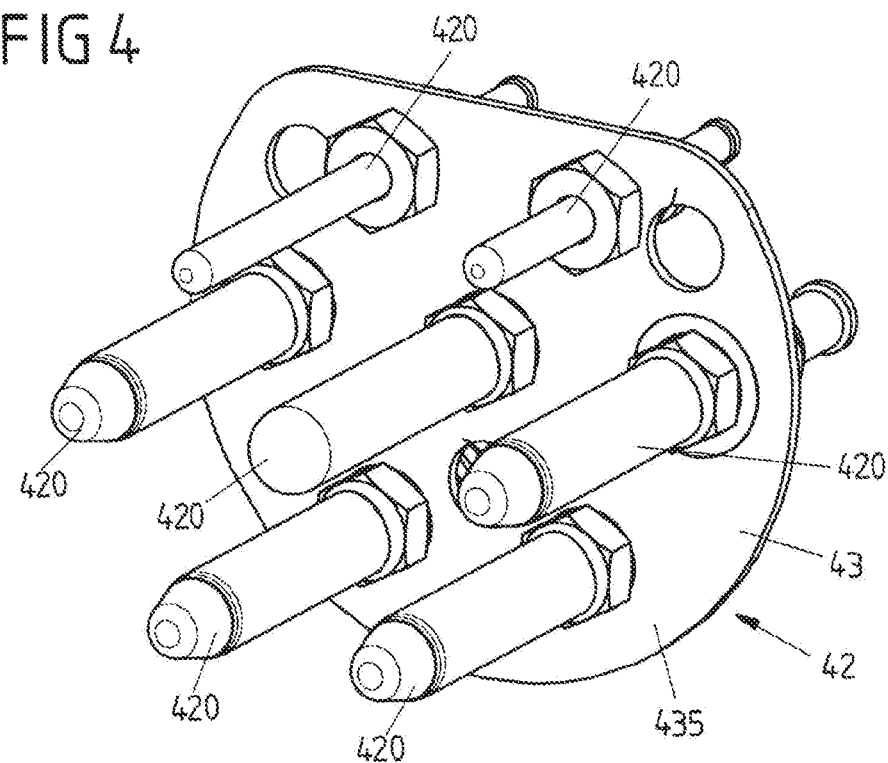
FIG. 4 is a perspective view of a contact assembly of the plug-in connector part.
Figure 5:
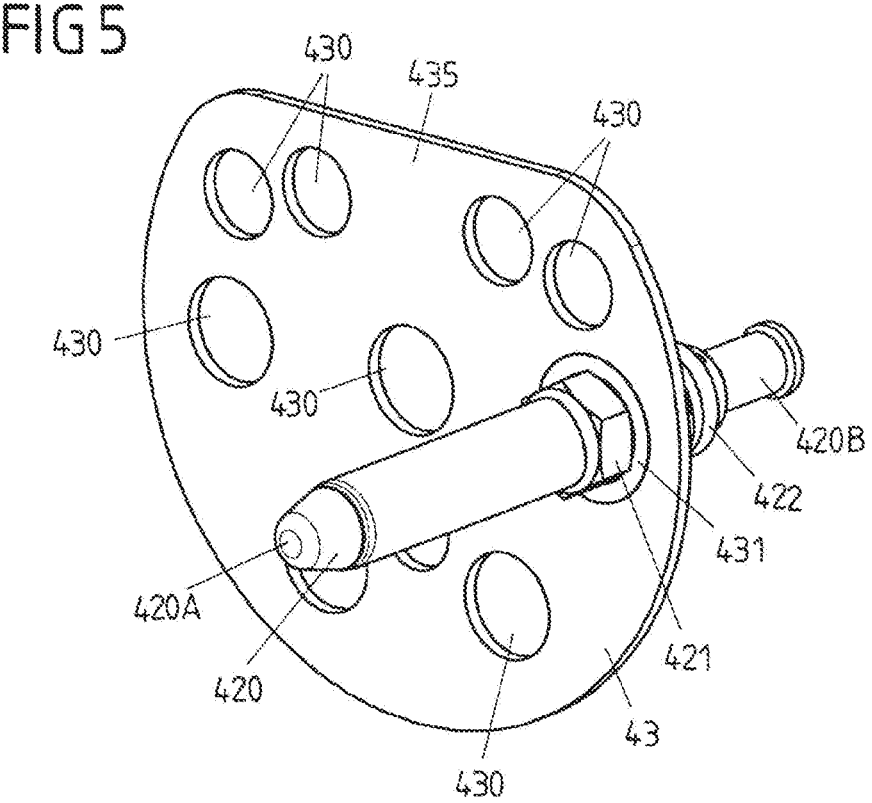
FIG. 5 is a view of the contact assembly, comprising just one contact element arranged on a support element.

As can be seen from FIG. 3, the contact elements 420 are components of a contact assembly 42, which can be fixed to the plug insert 41 in the form of a modular unit. The housing of the plug-in connector part 4 is completed by additional housing parts 44, 45, which are to be connected to the (front) housing part 40 such that a plug-in connector is produced, which is sealed so as to be moisture-tight, for example.

Each contact element 420 projects from the support element 435 by means of a first end 420A and sits in the opening 411 in the plug-in portion 410 of the plug insert 41 that is associated with said contact element. Said contact element makes electrical contact with a conductor wire of an electrical cable, for example, by means of a second, opposite end end 420B.

As can be seen from the views according to FIGS. 4 to 6A and 6B, the contact assembly 42 comprises a temperature-monitoring device 43 comprising a support element 435. The support element 435 is formed by a printed circuit board comprising openings 430 made therein, for example, an opening 430 being assigned to each contact element 420 and each contact element 420 therefore extending through an opening 430.

The support element 435 extends in a plane E (see FIG. 7 and FIG. 8A-8C). The contact elements 420 are formed by cylindrical contact pins and extend through the openings 430 in the support element 435, perpendicularly to the plane E.

The temperature-monitoring device 43, to which the support element 435 belongs, is used to detect whether the temperature of at least the contact elements 420 that are used to transmit large currents during operation of the plug-in connector part 4 (load contacts) has increased to an excessive and unreliable extent. If a contact element 420 heats up to above a reliable temperature threshold during operation of the plug-in connector part 4, the plug-in connector part 4 can be damaged or even completely destroyed as a result, which should be avoided.

By means of the temperature-monitoring device 43 and a superordinate control device 5 connected thereto (see FIG. 7), which can be a component of a charging station 2 for example (see FIG. 1), a flow of current can be controlled on the basis of a rise in temperature than may occur, in order to limit a rise in temperature to a permissible extent and to take suitable countermeasures, for example reducing a charging current or switching off the charging current, if necessary.

Figure 7:
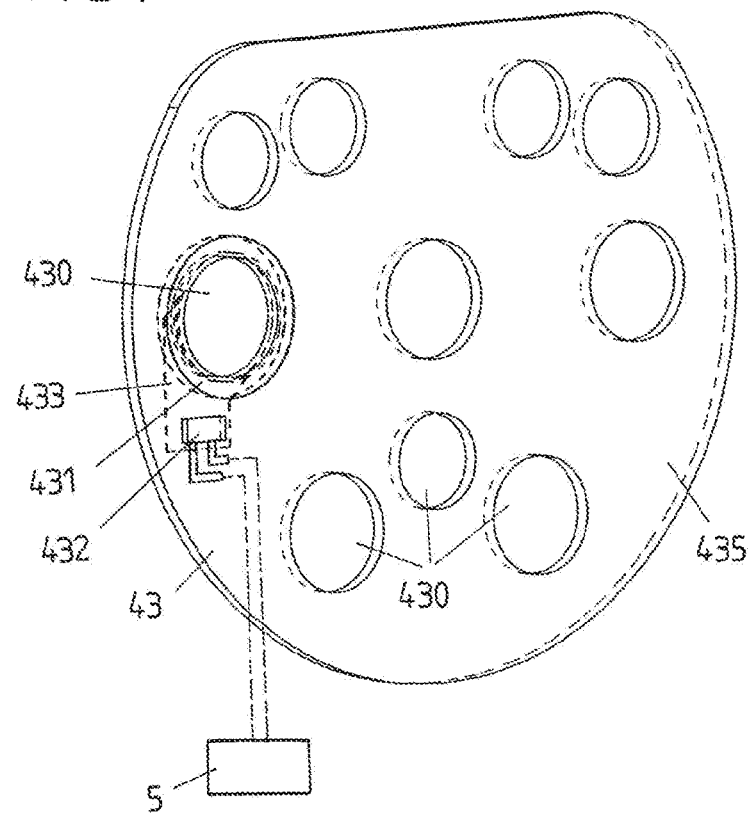
FIG. 7 is a separate view of the support element of the contact assembly.
Figure 8A:
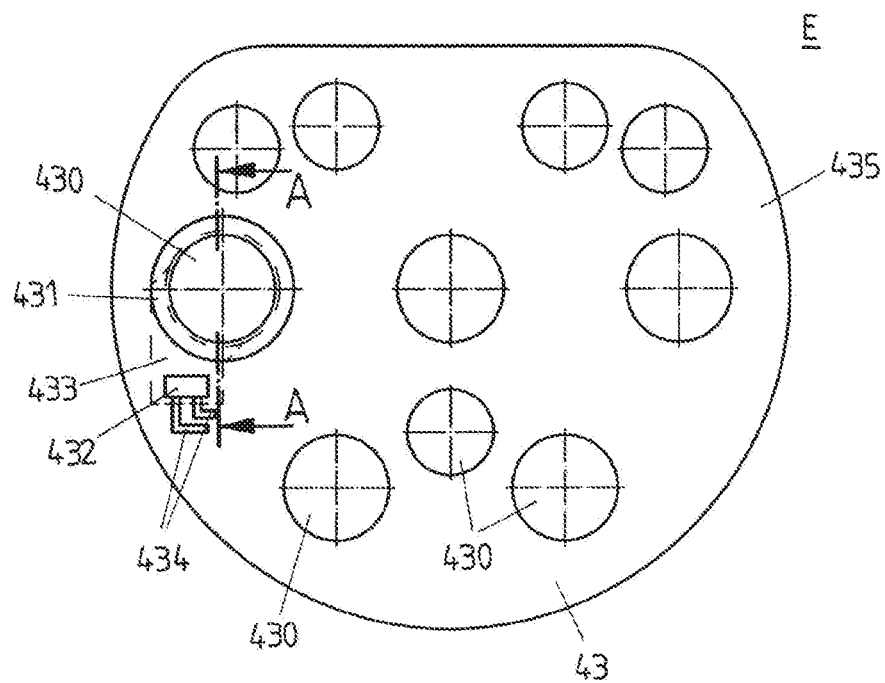
FIG. 8A is a front view of the support element according to FIG. 7.

In order to beneficially monitor the temperature of the contact elements 420, the support element 435 comprises a metal coating on each of the openings 430 in order to provide a contact surface 431A-C in the form of a VIA 431 (shown for example in FIG. 7 by means of an individual opening 430). As can be seen in particular from the enlarged sectional view according to FIG. 8C, this VIA 431 is formed by a cover surface 431A that runs cylindrically around the opening 430 and contacting rings 431B, 431C that are attached to the support element 435 on either side. The cover surface 431A covers the edge of the opening 430 on the inside, while the contacting rings 431B, 431C cover the surface on either side of the support element 435 by running around the associated opening 430 in the form of a ring.

As can be seen from FIG. 6A and 6B for example, each contact element 420 comprises a cylindrical shank portion 423, by means of which it sits in an associated opening 430 in the support element 435. A collar 422 radially protrudes from the shank portion 432 in the form of a cylindrical ring collar that runs around the shank portion 423 in the shape of a ring. If the contact element 420 is inserted into the opening 130 in the support element 435 associated therewith, the protruding collar 422 abuts the contacting ring 431C on the (first) side 435C of the support element 435. By means of a screw element 421 screwed onto the shank portion 423, the contact element 420 is clamped on the support element 435 here, the screw element 421 coming to lie on a second side 435B of the support element 435 that is opposite the first side 435C and abutting the contacting ring 431B of the VIA 431 arranged on this side 435B such that (additional) contact between the contact element 420 and the VIA 431 of the support element 435 is produced by means of the collar 422 on one side and by means of the screw element 421 on the other side, and the support element 435 is clamped between the collar 422 and the screw element 421.

The VIA 431 on one opening 430 is used to produce beneficial thermal coupling between the contact element 420 extending through the opening 430 and the support element 435. In the embodiment shown, a coupling portion 433 that extends over the entire surface of said temperature-monitoring device inside the support element 435, away from the associated openings 430, is connected to the cover surface 431A inside the support element 435 (see in particular FIG. 7 (dashes lines) and FIG. 8C). This coupling portion 433 is used to thermally couple a sensor device 432 associated with the opening 430 and therefore the contact element 420 lying in the associated opening 130 to the VIA 431.

As can be seen from FIGS. 7 and 8C in particular, the sensor device 432 is arranged on the surface of a (first) side 435C of the support element 435 and is opposite the coupling portion 433 that extends inside the support element 435.

Since the sensor device 432 is arranged above the coupling portion 433 inside the support element 435 with the interposition of electrically insulating material of the support element 435 (when viewed in the direction perpendicular to the plane E), the sensor device 432 is electrically insulated from the VIA 431 and therefore from the contact element 420. In this case, the intermediate layer between the sensor device 432 and the coupling portion 433 can be comparatively thin, for example only a few tenths of a millimeter, such that the sensor device 432 is beneficially coupled to the coupling portion 433, and is coupled to the VIA 431 and therefore to the contact element 420 via the coupling portion 433.

The VIA 431 is made of a metal material, for example copper, in the same way as the coupling portion 433. If a contact element 420 associated with an opening 430 heats up, this also leads to a rise in temperature of the VIA 431 of the opening 430 and therefore of the coupling portion 433, the temperature of the VIA 431 and of the coupling portion 433 rising without a large time delay.

Since the coupling portion 433 has a large surface area in comparison with the sensor device 432 (see FIG. 7), when the coupling portion 433 heats up, the support element 435 swiftly heats up in the region around the associated sensor device 432 such that the sensor device 432 can respond to a rise in temperature of the coupling portion 433 without a large time delay. Control by means of sensor signals generated by the sensor device 432 can therefore be carried out with beneficial response behavior.

Conducting tracks 434 lead away from the sensor device 432 towards a superordinate control device 5, for example (see FIG. 7), which can be a component of a charging station 2, for example. The sensor signals generated by the sensor device 432 can be evaluated at the control device 5 in order to control currents flowing through the contact elements 420 on the basis of the sensor signals.

In principle, a sensor device 432 can be provided for each contact element 420 to be monitored. By means of the sensor devices 420, the temperature of the individual contact elements 420 to be monitored can therefore be monitored individually and a rise in temperature can be detected.

Alternatively, a sensor device 432 can also be assigned to a group of a plurality of contact elements 420 to be monitored. In this case, coupling portions 433 extend from the contact elements 420 to be monitored to the sensor device 432 doing the monitoring, so that the sensor device 432 is thermally coupled to all the contact elements 420, which are to be monitored, in the group of contact elements 420.

The support element 435 can be formed as a printed circuit board, for example. In this case, the support element 435 can, for example, be made of an electrically insulating support material, such as a plastics material, e.g. conventionally used FR4.

The underlying concept of the invention is not restricted to the above-described embodiments, but can also be implemented in a similar manner in completely different embodiments.

In principle, a plug-in connector part of the type described here is not only usable as a charging plug or a charging socket in a charging device for charging an electric vehicle, but can be used in various ways in completely different devices, wherever there is the need to monitor a rise in temperature of a contact element.

In principle, a plug-in connector part of the type described here can comprise one or more contact elements. In this case, one or more sensor devices can be used to monitor a rise in temperature.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 vehicle
2 charging station
3 charging cable
30, 31 charging plug
4 plug-in connector part
40 housing part
400 collar
401 opening
41 plug insert
410 plug-in portion
411 opening
42 contact assembly
420 contact element
420A, end
420B end
421 screw element (nut)
422 collar
423 shank portion
43 temperature-monitoring device
430 opening
431 VIA
431A inner cover surface
431B, contacting ring
431C contacting ring
432 sensor device
433 coupling portion
434 conducting tracks
435 support element
435B, side
435C side
44 housing part
45 housing part
5 control device
E plane

The invention claimed is:

1. A plug-in connector part for connection to a mating plug-in connector part, comprising:
    a housing part;
    at least one electrical contact element, which is arranged on the housing part, configured to establish electrical contact with the mating plug-in connector part; and
    a temperature-monitoring device comprising at least one sensor device configured to detect a rise in temperature of the at least one contact element,
    wherein the temperature-monitoring device comprises a support element that extends over an entire surface of the temperature-monitoring device along a plane and comprises at least one opening and a contact surface arranged at the at least one opening, the at least one contact element extending through the at least one opening such that the at least one contact element abuts the contact surface, and the at least one sensor device being arranged on the support element so as to detect a rise in temperature of the at least one contact element, wherein a metal coupling portion is connected to the contact surface and extends inside the support element, proceeding from the contact surface, in parallel with the plane, wherein the at least one sensor device is arranged on a side of the support element and is electrically insulated from the coupling portion, and wherein, when viewed in a direction perpendicular to the plane of the support element, the coupling portion is arranged inside the support element beneath the at least one sensor device.

2. The plug-in connector part of claim 1, wherein the contact surface is comprised of a metal material that extends over the support element made of an electrically insulating material.

3. The plug-in connector part of claim 1, wherein the at least one contact element extends through the at least one opening perpendicularly to the plane of the support element.

4. The plug-in connector part of claim 1, wherein the at least one opening extends through the support element in a circular-cylindrical manner and the contact surface surrounds the opening.

5. The plug-in connector part of claim 1, wherein the contact surface has a cover surface that comprises a metal layer that surrounds the at least one opening.

6. The plug-in connector part of claim 1, wherein the contact surface comprises at least one metal contacting ring, which is arranged on one side of the support element, which extends over the entire surface of said temperature-monitoring device along the plane, and runs around the at least one opening.

7. The plug-in connector part of claim 1, wherein the at least one contact element sits in the at least one opening via a cylindrical shank portion and is clamped to the support element.

8. The plug-in connector part of claim 7, wherein the at least one contact element comprises a collar, which radially projects from the shank portion and is arranged on a first side of the support element.

9. The plug-in connector part of claim 8, wherein the at least one contact element comprises a screw element, which is screwed onto the shank portion and is arranged on a second side of the support element that is opposite the first side such that the support element is clamped between the collar and the screw element.

10. The plug-in connector part of claim 1, wherein the plug-in connector part comprises a plurality of contact elements and the temperature-monitoring device comprises a plurality of sensor devices, each sensor device being assigned to exactly one contact element so as to detect a rise in temperature of the contact element.

11. The plug-in connector part of claim 1, wherein the plug-in connector part comprises a plurality of contact elements, a sensor device being assigned to a group of a plurality of the contact elements so as to detect a rise in temperature of the group of contact elements.

* * * * *